US008028915B2

(12) United States Patent
Pang et al.

(10) Patent No.: US 8,028,915 B2
(45) Date of Patent: Oct. 4, 2011

(54) CONFIGURATION MIGRATION FOR DATA CAPTURE SYSTEMS

(75) Inventors: Robert James Pang, Williston Park, NY (US); Kenneth S. Bhella, Stony Brook, NY (US); Viraj Jeevan Thameera Amarasekera, Kadawatha (LK); Christopher Warren Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 914 days.

(21) Appl. No.: 12/008,461

(22) Filed: Jan. 11, 2008

(65) Prior Publication Data

US 2008/0179388 A1    Jul. 31, 2008

Related U.S. Application Data

(63) Continuation-in-part of application No. 11/731,394, filed on Mar. 30, 2007, now Pat. No. 7,568,614.

(60) Provisional application No. 60/788,959, filed on Apr. 4, 2006.

(51) Int. Cl.
*G06F 17/00* (2006.01)
*G06F 19/00* (2006.01)
*G06K 7/10* (2006.01)

(52) U.S. Cl. ............... 235/462.15; 235/383; 235/462.01; 235/462.14; 235/462.25; 235/462.45; 235/462.46; 235/462.49; 235/472.01; 235/472.02; 235/472.03

(58) Field of Classification Search .................. 235/375, 235/462.01, 462.14, 462.15, 462.25, 462.45–462.49, 235/472.01–472.03, 383

See application file for complete search history.

(56) References Cited

U.S. PATENT DOCUMENTS

| 4,866,257 | A |   | 9/1989  | Elliott et al. |
| 4,951,245 | A |   | 8/1990  | Bailey et al. |
| 5,157,687 | A |   | 10/1992 | Tymes |
| 5,875,415 | A | * | 2/1999  | Lieb et al. ................. 702/122 |
| 5,900,613 | A | * | 5/1999  | Koziol et al. ............ 235/462.15 |
| 6,094,689 | A |   | 7/2000  | Embry et al. |
| 6,115,678 | A | * | 9/2000  | Lieb et al. ................. 702/122 |
| 6,347,341 | B1 |  | 2/2002  | Glassen et al. |
| 6,507,864 | B1 |  | 1/2003  | Klein et al. |
| 6,698,656 | B2 | * | 3/2004 | Parker et al. ............ 235/462.01 |
| 6,959,865 | B2 |  | 11/2005 | Walczyk et al. |

(Continued)

OTHER PUBLICATIONS

Notice of Allowance and Fee(s) Due with attached Notice of References Cited for U.S. Appl. No. 11/731,394 mailed Jan. 21, 2009.
Non Final Office Action for US Patent No. 7,568,614 dated Jun. 23, 2008, the parent of U.S. Appl. No. 12/008,461.
International Preliminary Report on Patentability and the Written Opinion of the International Searching Authority for PCT/US2007/008279 dated Oct. 8, 2008, a foreign counterpart.

*Primary Examiner* — Thien M. Le
*Assistant Examiner* — Tuyen K. Vo
(74) *Attorney, Agent, or Firm* — Nongqiang Fan

(57) ABSTRACT

A current data capture system has a set of configuration parameters operative for enabling the current data capture system to capture transaction data. A configuration host is operative for pulling the set of configuration parameters from the current data capture system, and for pushing a pulled set of configuration parameters to at least one additional data capture system to enable the at least one additional data capture system to capture the transaction data.

16 Claims, 3 Drawing Sheets

U.S. PATENT DOCUMENTS

| | | |
|---|---|---|
| 7,387,253 B1 | 6/2008 | Parker et al. |
| 7,568,614 B2 | 8/2009 | Pang et al. |
| 2003/0209605 A1* | 11/2003 | Walczyk et al. ......... 235/472.01 |
| 2004/0206821 A1* | 10/2004 | Longacre et al. ........ 235/462.07 |
| 2005/0161511 A1* | 7/2005 | Parker et al. ............. 235/472.01 |
| 2007/0044092 A1 | 2/2007 | Banerjee |
| 2007/0126554 A1 | 6/2007 | Choi et al. |
| 2007/0241185 A1 | 10/2007 | Pang et al. |

* cited by examiner

CONFIGURATION MIGRATION FOR DATA CAPTURE SYSTEMS

CROSS REFERENCE TO RELATED APPLICATIONS

This application is a continuation-in-part of U.S. patent application Ser. No. 11/731,394, filed Mar. 30, 2007, now U.S. Pat. No. 7,568,614 which, in turn, claims the priority of U.S. Patent Provisional Application Ser. No. 60/788,959, filed Apr. 4, 2006.

BACKGROUND OF THE INVENTION

1. Field of the Invention

The present invention generally relates to in-field remote management of data capture systems, such as electro-optical readers, preferably laser scanners for reading indicia, such as bar code symbols, as well as imagers for capturing an image of such indicia or other targets, as well as radio frequency identification (RFID) devices for identifying targets and, more particularly, to an arrangement for, and a method of, migrating a configuration of one data capture system to one or more additional data capture systems.

2. Description of the Related Art

Various electro-optical readers or data capture systems have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam reader operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector that detects light along the scan line that is reflected or scattered from the symbol. The photodetector or sensor is positioned such that it has a field of view that ensures the capture of the reflected or scattered light, and converts the latter into an electrical analog signal.

In retroreflective light collection, a single optical component, e.g., a reciprocally oscillatory mirror, such as described in U.S. Pat. Nos. 4,816,661 or 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Both one- and two-dimensional symbols can be read by employing moving-beam readers, as well as imaging readers. For example, a solid-state imager may be employed which has a one- or two-dimensional array of cells or photosensors that correspond to image elements or pixels in a field of view of the imager. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to use radio waves to automatically identify objects, people, or like targets. A radio frequency identifier (RFID) tag or transponder identifies a target. An RFID reader interrogates the tag and converts radio waves reflected back from the tag into digital data.

As satisfactory as such moving-beam readers, imaging readers and RFID readers are in capturing data, such data capture systems are not easily updated in the field. Typically, a portable data capture system is connected, and movable relative, to a transaction terminal operative for processing transaction data captured by the system. It is up to a human user to disconnect the system and initiate the process of connecting the system to a dedicated configuration computer operative for upgrading the system by loading a set of updated configuration parameters. Alternatively, the user can upgrade each system by scanning parameter bar code symbols which self-configure each system. Such upgrading, however, can lead to costly disruptions due to the system being out of service. In some applications, there is a multitude of systems that are operatively connected to a single transaction terminal. Disconnecting and upgrading each system, in turn, is a laborious procedure. Frequently, many systems are simply not upgraded due to the great effort involved.

In addition, such data capture systems are not easily replaced in the field. When an old data capture system having a set of old configuration parameters needs to be replaced with one or more new data capture systems, it is often desired to migrate or transfer the old configuration parameters to the new data capture systems so that the new systems will work just like the old system. However, the set of old configuration parameters may be lost or misplaced. The set of old configuration parameters may not be the same for the new systems, especially if the family or type of new systems is different from that of the old system. Seamless or problem-free migration of configuration parameters between different families of systems is not now available, especially when the configuration parameters are not known.

SUMMARY OF THE INVENTION

One feature of the present invention resides, briefly stated, in a configuration migration arrangement and method, in which a current data capture system has a set of configuration parameters operative for enabling the current data capture system to capture transaction data, in which at least one additional data capture system is to be configured with the set of configuration parameters, and in which a configuration host is operatively connected to all the data capture systems, for pulling the set of configuration parameters from the current data capture system, and for pushing a pulled set of configuration parameters to the at least one additional data capture system to enable the at least one additional data capture system to capture the transaction data.

Each data capture system may be an electro-optical moving beam reader for reading indicia, such as one- or two-dimensional bar code symbols, by scanning a laser beam across the symbols, or a solid-state imaging reader for imaging a target that can be any person, place, or thing, or a radio frequency identification (RFID) reader for interrogating a target with radio waves. The configuration host is a computer and may be a transaction terminal, for example, a point of sale workstation or a cash register, which is connected to each data capture system via a wireless or wired link. In the preferred embodiment, the data capture systems are handheld devices that are operable and transportable by hand from one place to another.

The configuration host is operative for parsing the pulled set of configuration parameters and for filing a parsed set of configuration parameters into a configuration file. The configuration host is further operative for loading the configuration file into the at least one additional data capture system. Preferably, the configuration host automatically pulls the set of configuration parameters, and automatically pushes the pulled set of configuration parameters. In a preferred application, the configuration host is operative for simultaneously pushing the pulled set of configuration parameters to a plurality of the additional data capture systems.

Each of the data capture systems has a controller or microprocessor programmed with a common protocol operative for mapping the set of configuration parameters. In a variant, the data capture systems have different protocols operative for mapping respective sets of configuration parameters. The configuration host is operative for accessing a translation table in which a plurality of mapped sets of configuration parameters for different data capture systems are stored, and the configuration host automatically accesses the stored set of configuration parameters from the translation table, and automatically pushes an accessed stored set of configuration parameters to the at least one additional data capture system.

The steps of the method are performed by configuring a current data capture system with a set of configuration parameters operative for enabling the current data capture system to capture transaction data, by providing at least one additional data capture system to be configured with the set of configuration parameters, by pulling the set of configuration parameters from the current data capture system, and by pushing a pulled set of configuration parameters to the at least one additional data capture system to enable the at least one additional data capture system to capture the transaction data.

Hence, configuration settings from a current data capture system are seamlessly migrated or transferred to one or more additional data capture systems, even when the systems are of different types, without having to have actual knowledge of the configuration settings. There is no downtime associated with having to manually scan special configuration bar code symbols, or with having to individually connect each system to a dedicated computer.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
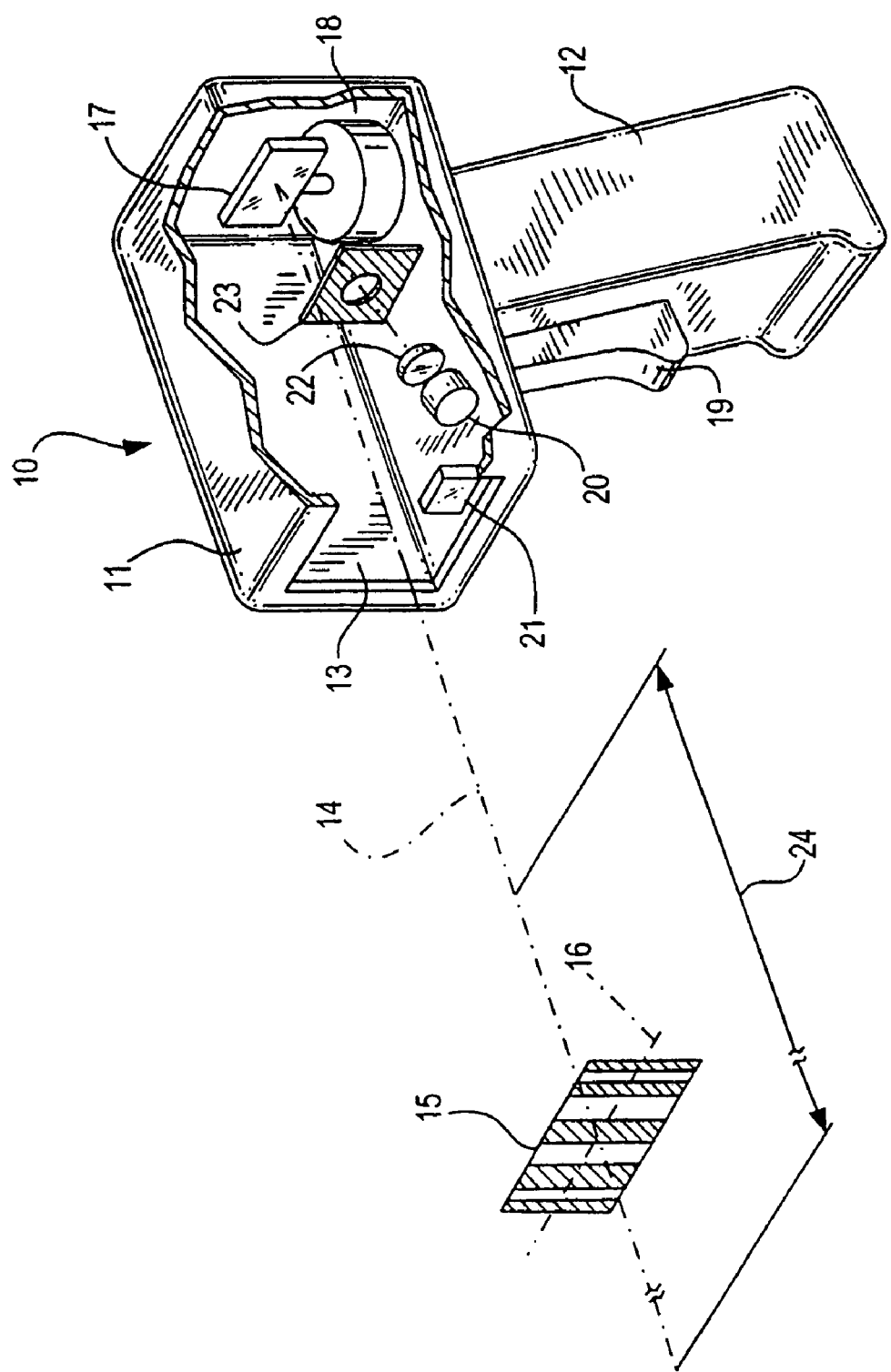
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia that may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10, also termed herein as a current or source data capture system, for reading symbols. The laser scanner device 10 includes a housing having a barrel portion 11 and a handle 12. The barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20 mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a convex portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light.

A digitizer typically converts the analog signal into a pulse width modulated digital signal, with the pulse widths and/or spacings corresponding to the physical widths of the bars and spaces of the scanned symbol 15. A decoder, typically comprising a programmed microprocessor with associated random access memory (RAM) and read only memory (ROM), decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size that extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules. A display 25 is typically mounted on the housing 1'1 to display information related to the indicia being read.

Figure 2:
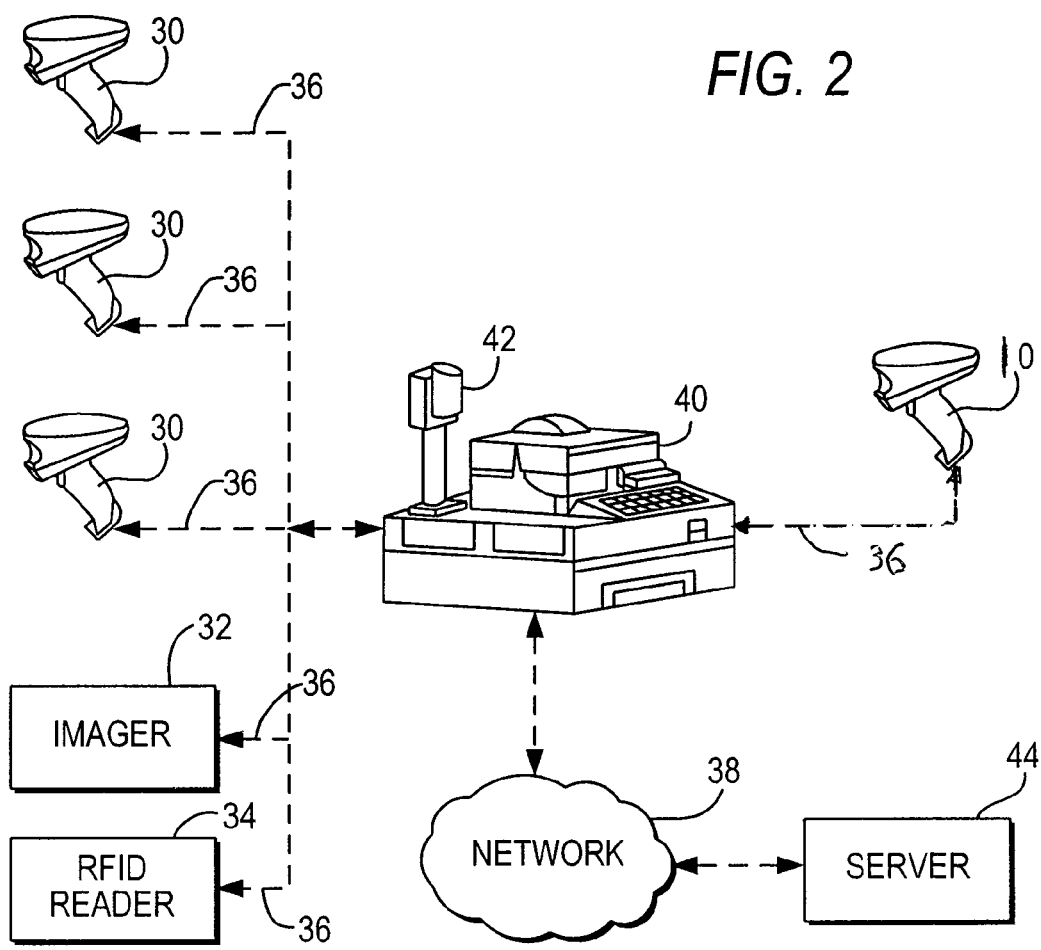
FIG. 2 is a circuit schematic depicting an in-field configuration migration arrangement in accordance with the present invention for enabling configuration settings from one data capture system, such as the reader of FIG. 1, to be migrated to a plurality of other data capture systems by a host computer.

As described so far, the handheld scanner device 10 is a data capture system having a set of configuration parameters, as described in detail below, for capturing transaction data indicative of the symbol 15. FIG. 2 depicts an architecture for in-field migration of the configuration parameters from the current or source data capture system 10 to one and preferably to a multitude of such data capture systems, such as handheld laser scanner devices 30, essentially identical to device 10, imaging reader 32 for capturing an image of the symbol or a target prior to processing the image into the transaction data, and an RFID reader 34 for interrogating an RFID tag or transponder to obtain the transaction data. The illustrated number and type of data capture system in FIG. 2 is merely exemplary, since more or less than the illustrated systems can, and often is, employed in a real-world application. Other data capture systems contemplated by this invention include card readers, such as magnetic stripe readers and smart card readers, and devices having a screen for capturing a signature, a fingerprint, or a human touch.

Each of these systems has a hard-wired connection or preferably a wireless connection 36 to one or more access points or nodes of a network 38. One of the nodes is depicted as a configuration host computer or transaction terminal 40, preferably constituted, as shown, as a cash register in a supermarket environment. However, it will be understood that the terminal is not to be restricted to a cash register and that any host computer, such as a laptop computer or a desktop computer, will do. Also, the terminal need not be stationary and can be mobile. The term "terminal" is to be interpreted in its broadest sense as any device having intelligence. The terminal 40 may have a cradle 42 for supporting the system. Each system 10, 30, 32, 34 preferably has a wireless transceiver for communication over a wireless interface, such as wide area network (WAN), local area network (LAN), or personal area network (PAN), such as Bluetooth™. A plurality of transaction terminals 40 is often configured in the network 38. Each system is preferably handheld, portable and movable relative to the terminal to which it is operatively connected by a wired or a wireless connection.

Each transaction terminal 40 is operative for executing a point of sale (POS) application loaded on the terminal 40 and operative for processing the transaction data captured by a respective system. This typically involves retrieving information, for example, prices, from a look-up table (LUT) on the network 38, or retrieving inventory information, with the aid of a LUT server. Each transaction terminal is also operative for executing a management program, for processing management data from the terminal to one, some, or all the data capture systems. From time to time, the firmware on each system is updated for enhanced system operation. The POS application and the management application may also be loaded on a remote server 44, for example, a computer, away from the terminal 40 that is operatively connected over the network 38 to all the terminals 40 and their associated data capture systems. The server 44 initiates an upload over the network 38 to the transaction terminal 40 which, in turn, communicates the update data to the systems. If the terminal permits, the upload can be initiated from the terminal itself.

Also, monitoring data generated by each system itself and indicative of various operating conditions being monitored, such as the identification, health and statistics of the system, is downloaded from one or more of the systems to one or more of the terminals over the network 38 to the server 44. Any one of the systems 10, 30, 32, 34, the terminal 40 or the server 44 may initiate the download. Corrective action by the server is uploaded to the system being monitored.

In accordance with one aspect of this invention, the current data capture system 10 has a set of configuration parameters operative for enabling the current data capture system 10 to capture transaction data; and it is required to configure at least one additional data capture system 30, 32, 34, and preferably a plurality thereof, with the set of configuration parameters. For this purpose, the configuration host 40 is operatively connected to all the data capture systems, for pulling the set of configuration parameters from the current data capture system 10, and for pushing a pulled set of configuration parameters to the additional data capture systems 30, 32, 34 to enable the latter to capture the transaction data in the same manner as the data capture system 10.

The configuration host 40 is operative for parsing the pulled set of configuration parameters and for filing a parsed set of configuration parameters into a configuration file. The configuration host 40 is further operative for loading the configuration file into the at least one additional data capture system 30, 32, or 34. The configuration host 40 automatically pulls the set of configuration parameters, and automatically pushes the pulled set of configuration parameters. The configuration host 40 is operative for simultaneously pushing the pulled set of configuration parameters to a plurality of the additional data capture systems.

It is advantageous when each of the data capture systems has a controller programmed with a common protocol operative for mapping the set of configuration parameters. In a variant, the data capture systems have different protocols operative for mapping respective sets of configuration parameters. The configuration host 40 is operative for accessing a translation table in which a plurality of mapped sets of configuration parameters for different data capture systems are stored. The configuration host 40 automatically accesses the stored set of configuration parameters from the translation table, and automatically pushes an accessed stored set of configuration parameters to the at least one additional data capture system 30, 32, or 34.

Figure 3:
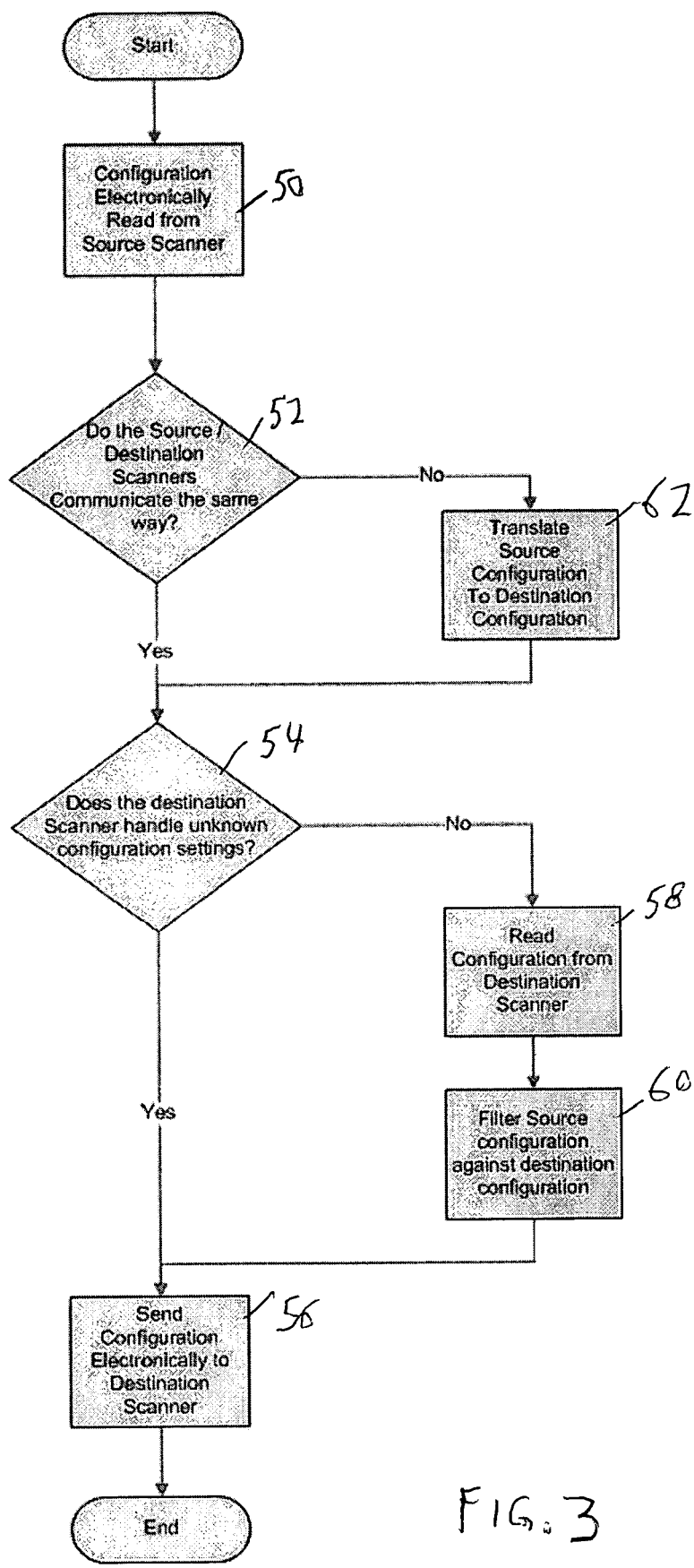
FIG. 3 is a flow chart schematic depicting steps in the migration of the configuration settings by the host computer in accordance with the present invention.

As shown in the flow chart of FIG. 3, the configuration host 40 electronically reads in step 50 the configuration parameters from the system 10, also know as the source scanner. Next, the host 40 determines in step 52 whether the protocol of the source system 10 and the additional systems, also known as the destination systems 30, 32, 34, are the same. If so, then the host 40 determines in step 54 whether the destination system can handle the transfer of the configuration parameters. If it can, then the host 40 in step 56 transfers the configuration parameters to the destination system. If not, then the host 40 reads the configuration parameters from the destination system in step 58, and then, in step 60 the host 40 filters the configuration parameters of the source system 10 against the configuration parameters of the destination systems, 30, 32, 34. If the source and destination systems do not share a common protocol, then the host 40 employs the aforementioned translation table in step 62.

In accordance with this invention, the migration of configuration parameters from an older, existing system to a new, replacement system is substantially seamless. Essentially, the older system 10 is operatively connected to the host 40 on which a software program or tool extracts the current set of configuration parameters via a predetermined protocol. The configuration settings are pulled and parsed by the host 40, which then places the parsed settings into a configuration file. A user may be provided with additional functionality to fine tune the extracted configuration parameters. Thereafter, the host 40 sends the configuration file to the new destination system. The new system will function in the same manner as the older system. The older and replacement systems will be interchangeable in the same environment.

The seamless migration described herein allows the user to move their purchasing and deployment of data capture systems from one family of systems to another, without having exact knowledge of how the older system was configured, thereby simplifying product migration. The loss or misplacement of older configuration parameters is no longer an issue when migrating to replacement systems.

When the different data capture systems do not have a common protocol in which to map their configuration parameters, the aforementioned translation table or algorithm is operative to specifically map address/value pairs of configuration parameters from a known system into equivalent address/value pairs or groups for a different known system. The translation table avoids the need for a common protocol to be shared by all the data capture systems.

The configuration parameters to be migrated in accordance with this invention include device parameters such as, but not limited to, power mode, laser on-time, scan line width, trigger mode, raster mode, beep-on-good decode, and transmit-no-read, as well as operational mode parameters, such as in-cradle detect, operational mode, and charging mode. The configuration parameters further include beeper parameters, such as volume frequency and wireless communication parameters such as authentication, encryption and pincode. The configuration parameters may further include advanced data formatting parameters whose rules depend upon the bar code symbols to be read, as well as symbology parameters to indicate the particular symbology of symbols to be read. In addition, the configuration parameters may include system up-time indicating how long the system has been running after being powered up, as well as diagnostics concerning an on-board battery.

It will be understood that each of the elements described above, or two or more together, also may find a useful application in other types of constructions differing from the types described above.

While the invention has been illustrated and described as embodied in in-field migration of configuration settings among data capture systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A configuration migration arrangement, comprising:
a current data capture system having a set of configuration parameters operative for enabling the current data capture system to capture transaction data;
at least one additional data capture system to be configured with the set of configuration parameters; and
a configuration host operatively connected to all the data capture systems, for pulling the set of configuration parameters from the current data capture system, and for pushing a pulled set of configuration parameters to the at least one additional data capture system to enable the at least one additional data capture system to capture the transaction data; and
wherein the current data capture system and the at least one additional data capture system have different protocols operative for mapping respective sets of configuration parameters, wherein the configuration host is operative for accessing a translation table in which a plurality of mapped sets of configuration parameters for different data capture systems are stored, and wherein the configuration host automatically accesses the stored set of configuration parameters from the translation table, and automatically pushes an accessed stored set of configuration parameters to the at least one additional data capture system.

2. The arrangement of claim 1, wherein the configuration host is operative for parsing the pulled set of configuration parameters and for filing a parsed set of configuration parameters into a configuration file, and wherein the configuration host is further operative for loading the configuration file into the at least one additional data capture system.

3. The arrangement of claim 1, wherein the configuration host automatically pulls the set of configuration parameters, and automatically pushes the pulled set of configuration parameters.

4. The arrangement of claim 1, wherein all the data capture systems are in wireless communication with the configuration host.

5. The arrangement of claim 1, wherein the configuration host is operative for simultaneously pushing the pulled set of configuration parameters to a plurality of the additional data capture systems.

6. The arrangement of claim 1, wherein the data capture systems are selected from a group including a moving beam reader for scanning indicia with a laser beam, an imaging reader for capturing an image of the indicia, and a radio frequency identification (RFID) reader.

7. The arrangement of claim 1, wherein each data capture system is a handheld device movable relative to the configuration host.

8. A configuration migration arrangement, comprising:
a current data capture means having a set of configuration parameters operative for enabling the current data capture means to capture transaction data;
at least one additional data capture means to be configured with the set of configuration parameters; and
a configuration means operatively connected to all the data capture means, for pulling the set of configuration parameters from the current data capture means, and for pushing a pulled set of configuration parameters to the at least one additional data capture means to enable the at least one additional data capture means to capture the transaction data; and
wherein the current data capture means and the at least one additional data capture means have different protocols operative for mapping respective sets of configuration parameters, wherein the configuration host is operative for accessing a translation table in which a plurality of mapped sets of configuration parameters for different data capture systems are stored, and wherein the configuration host automatically accesses the stored set of configuration parameters from the translation table, and automatically pushes an accessed stored set of configuration parameters to the at least one additional data capture system.

9. The arrangement of claim 8, wherein the configuration means is operative for parsing the pulled set of configuration parameters and for filing a parsed set of configuration parameters into a configuration file, and wherein the configuration means is further operative for loading the configuration file into the at least one additional data capture means.

10. A configuration migration method, comprising the steps of:
configuring a current data capture system with a set of configuration parameters operative for enabling the current data capture system to capture transaction data;
providing at least one additional data capture system to be configured with the set of configuration parameters; and
pulling the set of configuration parameters from the current data capture system, and pushing a pulled set of configuration parameters to the at least one additional data capture system to enable the at least one additional data capture system to capture the transaction data; and
wherein the current data capture system and the at least one additional data capture system have different protocols operative for mapping respective sets of configuration parameters, and storing a plurality of mapped sets of configuration parameters for different data capture systems in a translation table, and automatically accessing the stored set of configuration parameters from the translation table, and automatically pushing an accessed stored set of configuration parameters to the at least one additional data capture system.

11. The method of claim 10, further comprising parsing the pulled set of configuration parameters and filing a parsed set of configuration parameters into a configuration file, and loading the configuration file into the at least one additional data capture system.

12. The method of claim 10, wherein the pulling and pushing steps are performed automatically.

13. The method of claim 10, wherein the pulling and pushing steps are performed by a configuration host, and wirelessly connecting all the data capture systems to the configuration host.

14. The method of claim 10, further comprising simultaneously pushing the pulled set of configuration parameters to a plurality of the additional data capture systems.

15. The method of claim 10, further comprising selecting the data capture systems from a group including a moving beam reader for scanning indicia with a laser beam, an imaging reader for capturing an image of the indicia, and a radio frequency identification (RFID) reader.

16. The method of claim 10, further comprising moving each data capture system by hand.

* * * * *